(12) United States Patent
Dick et al.

(10) Patent No.: US 7,487,974 B2
(45) Date of Patent: Feb. 10, 2009

(54) STAGGERED SKI SKAG

(75) Inventors: Brian W. Dick, Thief River Falls, MN (US); Jeff Olson, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 10/439,640

(22) Filed: May 16, 2003

(65) Prior Publication Data

US 2004/0227312 A1   Nov. 18, 2004

(51) Int. Cl.
*B62B 17/02*   (2006.01)
(52) U.S. Cl. ..................... 280/28; 280/28.15
(58) Field of Classification Search ............... 280/609, 280/15, 16, 21.1, 22.1, 28, 28.14, 28.15, 280/28.16; 180/182
See application file for complete search history.

(56) References Cited

U.S. PATENT DOCUMENTS

| | | | | | |
|---|---|---|---|---|---|
| 2,695,584 | A | * | 11/1954 | Watters | 114/43 |
| 3,374,003 | A | * | 3/1968 | Fulsom | 280/18 |
| 3,732,939 | A | * | 5/1973 | Samson | 280/28 |
| 3,773,343 | A | * | 11/1973 | Ambrose | 280/28 |
| 3,850,440 | A | * | 11/1974 | Reedy et al. | 280/28 |
| 3,917,301 | A | * | 11/1975 | Fabris | 280/28.14 |
| 3,942,812 | A | * | 3/1976 | Kozlow | 280/28 |
| 5,344,168 | A | * | 9/1994 | Olson et al. | 280/28 |
| 6,086,101 | A | * | 7/2000 | Cormican | 280/809 |
| 6,520,512 | B1 | * | 2/2003 | Lachance | 280/28 |
| 6,631,912 | B2 | * | 10/2003 | Metheny | 280/28 |
| 7,017,695 | B2 | * | 3/2006 | Meunier et al. | 180/182 |

FOREIGN PATENT DOCUMENTS

EP    001086877 A2 *  9/2000

OTHER PUBLICATIONS

"Dual Carbide Skag", Polaris, Snow Team Tips, vol. 9, No. 11, 2001 Polaris Sales Inc., Nov. 2001. Including pictures taken of product Aug. 2007.

* cited by examiner

*Primary Examiner*—Frank B Vanaman
(74) *Attorney, Agent, or Firm*—Black Lowe & Graham PLLC

(57) ABSTRACT

A skag for a ski, such as a vehicle ski. The skag includes a carrier platform to be attached to the bottom surface of a ski. First and second longitudinal rails are disposed on the bottom surface of the carrier platform. The longitudinal rails are spaced apart laterally from one another. The first and second rails are staggered, such that the forward end of the first rail is farther forward than the forward end of the second rail, and the aft end of the second rail is farther aft than the aft end of the first rail. The aft end of the first rail may be at least as far forward as the forward end of the second rail. At least one of the rails may have a longitudinal keel disposed thereon, and at least one of the rails may have a hard-surface weld-disposed thereon. When two skags are used together, as on two adjacent skis, the rails and/or keels on the skags may be arranged so that one skag is a mirror reverse of the other.

10 Claims, 16 Drawing Sheets

STAGGERED SKI SKAG

BACKGROUND OF THE INVENTION

1. Field of the Invention

The invention relates to a skag for a ski. More particularly, the invention relates to a skag that includes dual parallel rails and/or dual parallel keels staggered along the length of the skag, so as to provide improved maneuverability.

2. Description of Related Art

Skis and their use on vehicles are well known. FIG. 1 shows a conventional vehicle 10 (a snowmobile) with a ski 12 thereon. Conventional skis consist of a strip of material that is usually smooth or nearly smooth along its bottom surface. Conventional skis are used to support vehicles or persons on snow, ice, and similar terrain.

It is often desirable to make skis of materials that are relatively light, i.e. to reduce the weight of a vehicle, and/or flexible, i.e. to enable the ski to temporarily flex or deform instead of breaking when it is subjected to stress.

However, the terrain on which skis conventionally are used is often rough, and may subject the skis to considerable wear. Furthermore, even relatively smooth layers of snow, ice, etc. can be highly abrasive under certain conditions. Skis made from many materials that are light and/or flexible may wear out and/or break after a relatively short time.

To address this problem, a more durable material may be attached to the bottom surface of the skis. Sometimes referred to as "rails" or "wear strips", they are adapted to resist wear, thereby increasing the usable life of the ski. Rails 30A and 30B on conventional skags 20A and 20B can be seen in FIG. 3; a single rail 30 on a conventional skag 20 can also be seen in cross-section in FIG. 4.

In some cases, rather than being disposed directly on the ski, the rail 30 may be disposed on the bottom surface 24 of a carrier platform 22, such as a strip or bar of metal that conforms to and is connected to the bottom surface 14 of the ski 12.

As a further matter, skis without rails or some similar structure have limited ability to "grip" or "bite" snow or ice. This is of special concern when maneuvering the vehicle to which the ski is connected, i.e. when turning. Greater maneuverability may be desirable, especially at high speeds.

The previously described rails 30 or wear strips may provide additional maneuverability beyond that possible with an otherwise smooth ski 12, in addition to increasing durability. By projecting downward into and/or against the snow or ice, the rails 30 provide increased grip, and therefore improved maneuverability.

In addition, it is possible to shape the rail 30 or a portion thereof so as to form a longitudinal keel shape 36, such as a wedge or a blade. Alternatively, a keel 36 can be formed separately and mounted to a ski 12, without necessarily including a rail 30. The keel 36 functions in a manner similar to the rail 30 with regard to maneuverability, i.e. it cuts into the snow, ice, or other terrain on which the ski 12 rests, providing improved bite or grip that enhances performance, stability, and maneuverability.

In common use, the term "skag" sometimes is used to describe such a keel, and sometimes is used to describe a full assembly with such a keel that is attached to a ski. As used herein, the term "skag" is used with the latter definition, that is, a skag is a structure disposed on the lower side of a ski, which includes rails and/or a keel as described above.

A conventional skag typically is attached to the bottom surface 14 of a conventional ski 12. FIG. 2 shows a pair of conventional skis 12A and 12B with conventional skags 20A and 20B on their bottom surfaces 14A and 14B. FIGS. 2 and 3 show a pair of conventional skags 20A and 20B in greater detail, and a cross-section of a single conventional skag 20, respectively.

Conventional skags have several limitations.

First, because it cuts into the underlying surface, the keel 36 of a conventional skag 20 often leaves behind a trail or groove. If a second vehicle with a conventional skag 20 later follows the same path, the skag 20 on that second vehicle may follow the track from the first vehicle, thereby aligning the second vehicle's ski with the path followed by the first vehicle. Later vehicles also may follow the track, making it deeper and more pronounced.

As a result, the second and later vehicles tend to follow closely the path of the first vehicle, and resist efforts to steer out of that path. In addition, the second and later vehicles tend to shift, sometimes abruptly, to align themselves with the path of the first vehicle if that path is crossed. These phenomena are sometimes collectively referred to as "groove follow". The former also may be referred to as "tracking", while the latter may be referred to as "darting". Both phenomena may affect the maneuverability of the second and later vehicles.

Although it is possible to overcome darting and tracking by deliberately steering a vehicle out of the path of preceding vehicles, or by avoiding such earlier paths altogether, such solutions may not always be desirable.

For example, snowmobiles, which have used skis with conventional skags, are often used on dedicated snowmobile trails. Trails are not always sufficiently spacious to make it possible for vehicle operators to avoid the grooves left by previous vehicles. This is especially true in popular trails, and in areas of heavy traffic on a trail.

Furthermore, even if it is possible to make a special effort to avoid grooves from previous vehicles, it may be difficult or undesirable to do so.

Attempts to overcome this problem have been made. For example, in U.S. Pat. No. 5,344,168 to Olson et al., a generally flat bar is employed to disrupt existing skag grooves in an effort to avoid tracking and darting. However, the addition of this bar increases the drag on the ski, since in order for the bar to function it must dig into and break up the snow or ice in order to fill in the groove. Furthermore, the bar may not be effective in disrupting grooves in hard packed snow, or in wet snow that has frozen into ice.

Another feature of conventional skags that might be improved is the ability to maneuver. Although conventional skags provide increased maneuverability over skis lacking such structures, still greater maneuverability may be desired, especially at high speeds.

The ability to maneuver with a ski with a skag thereon depends in part upon the size of the skag's rail and/or keel. As the skag is made longer, it provides greater grip or "bite" into the underlying surface, thereby allowing more force to be applied when turning.

In addition, increasing the length of a skag reduces the total weight per unit length that must be borne thereby, assuming vehicle weight is not also increased when the skag is lengthened. This may contribute to reduced wear on the skag.

However, a long longitudinal skag also has disadvantages. For example, although the skag provides maneuverability, the skag itself must be made to turn against the snow or ice surrounding it on both sides. Thus, as the skag is lengthened, more force is required to turn it.

Furthermore, a ski on a vehicle that is turning typically follows a curved path. As the length of a conventional straight skag increases, the ends of the skag deviate by a greater distance from that curved path. A long straight skag following a curved path may cause the vehicle to turn roughly, or in "stutters".

Also, turning a ski with a skag thereon puts stress on the skag. As the skag length increases, the stress increases. At some point this can contribute to greater wear, and/or damage to the skag as a whole, its component parts, and/or the ski to which it is attached. For example, the increased stresses experienced by long skags may cause the skag to eventually become worn to the point that it must be replaced. The increased stresses for a long ski skag may also result in the failure of the ski skag, i.e. by the keel separating from the rail, by the rail separating from the carrier platform, by the skag or some portion thereof bending into an S-curve or otherwise deforming, etc. Because stress increases with increasing skag length, a longer ski skag is proportionally weaker than a shorter one, assuming they are made from similar materials using similar methods of construction.

Thus, although it is in some respects desirable to increase the total length of the skag, other factors limit the utility and durability of long conventional skag. For this reason, increasing the length of a conventional skag beyond a certain point does not provide further improvements in maneuverability for a vehicle equipped with a conventional skag.

Another limitation of conventional skags is that they may not be at full effectiveness in tight turns. When a vehicle turns, its skis typically do not lay flat on the underlying surface, but rather tilt into the turn. Under such conditions, the area of contact between the ski and the surface moves towards the edge of the ski, in the direction of the turn. The tighter the turn, the greater the tilt, and the more extreme the shift in contact area.

Skags are conventionally disposed in the center of a ski. As the ski comes to rest more on its edge, conventional skags are lifted at least partially out of contact with the underlying surface. As the skags lose contact with the surface, the ability of the skag to affect the maneuverability of the vehicle decreases. A skag that is shifted to one edge of a ski may compensate at least partially, but only for turns in one direction, and it may aggravate it when turning in the opposite direction.

A skag may incorporate multiple rails and/or keels. A patent application entitled DUAL SKI SKAG was filed on such an arrangement on Feb. 18, 2003. The serial number for that application is not available as of the filing date of the present application.

Such an arrangement is illustrated in FIG. 5. Therein, a pair of skags 220A and 220B are shown. Skag 220A has rails 230A and 240A, and skag 220B has rails 230B and 240B. Keels 236A, 246A, 236B, and 246B are disposed on rails 230A, 240A, 230B, and 240B respectively.

A dual skag arrangement as illustrated in FIG. 5 may increase the total effective length of the skag without necessarily increasing its actual length. However, the use of dual skags 220A and 220B also has limitations.

For example, the weight of a dual skag may be increased by the addition of a second rail and/or keel. This is of special concern when such a skag is used for vehicles intended for high speed and/or high acceleration, such as racing snowmobiles.

In addition, the increased quantities of material necessary to produce a dual skag may increase its cost. In particular, hard, durable materials suitable for use as keels, such as carbides, may be relatively expensive. Furthermore, producing a dual skag may increase the costs for manufacturing the skag, the time required, etc.

A dual skag also may be prone to a phenomenon sometimes referred to as "pop-up". Each of the rails 230A, 240A, 230B, and 240B and the keels 236A, 246A, 236B, and 246B shown in FIG. 5 has some width. Although neither FIG. 5 nor the other figures herein are necessarily to scale, it will be appreciated from FIG. 5 that some volume of snow or other material may be displaced by the rails 230A, 240A, 230B, and 240B and/or the keels 236A, 246A, 236B, and 246B. Under certain conditions, some of the displaced snow is forced into the space between each pair of adjacent rails. This may have the effect of forming a raised ridge of snow centered between adjacent rails.

The creation of this ridge of snow may be sufficient to cause the ski to pop upwards out of contact with the surrounding snow. Consequently, the full advantage of the skag may not be obtained. The sudden motion of repeated pop-ups may contribute to increased wear on the skag, the ski, or other components of the vehicle. In addition, pop-up may produce noise and/or vibration.

Pop up is of special concern in relatively light vehicles, since their lower weight means they can be lifted more easily from the surface of the snow if and when such ridges form.

As an additional matter, producing ridges sufficient to cause a vehicle's ski to pop up may not be desirable in itself, insofar as maintaining good trail conditions, etc.

As noted previously, in a conventional skag with a keel thereon, the keel typically does not run the full length of the rail. Certain performance drawbacks of very long keels are described above. In addition, although it may be advantageous to construct keels of extremely hard materials, such materials can be relatively expensive to obtain, and may require considerable labor and/or special equipment to produce and install. Consequently, in conventional skags a significant portion of the rails are not covered by keels, and thus are not protected from wear by the keels.

As a result, the portions of the rail that are not protected by the keel may wear more quickly than the portions that are. This may be especially true for vehicles that travel at high speeds, operate on hard or rough surfaces such as ice or frozen snow, etc.

SUMMARY OF THE INVENTION

It is the purpose of the claimed invention to overcome these difficulties, thereby providing an improved ski skag that provides high maneuverability and durability with low weight and convenient manufacturing.

An exemplary embodiment of a ski skag in accordance with the principles of the claimed invention includes first and second longitudinal rails adapted to be disposed on the bottom surface of a ski. The first and second rails are spaced apart laterally from one another.

The forward end of the first rail is farther forward than the forward end of the second rail, and the aft end of the second rail is farther aft than the aft end of the first rail. That is, the rails are not aligned along the length of the skag, though they may overlap.

The skag may include a carrier platform adapted to be attached to the bottom of the ski, with the rails attached to the bottom of the carrier platform.

The aft end of the first rail may be at least as far forward as the forward end of the second rail. That is, the rails may be arranged along the length of the skag so that they do not overlap.

The aft end of the first rail may be farther forward than the forward end of the second rail. That is, the rails may be arranged along the length of the skag so that they are spaced apart longitudinally from one another.

At least one of the rails may have a keel thereon. At least one of the rails may have a hard-surface weld disposed thereon.

An exemplary embodiment of a ski skag kit in accordance with the principles of the claimed invention includes first and second ski skags.

The first ski skag includes first and second longitudinal rails adapted to be disposed on the bottom surface of a first ski. The first and second rails are spaced apart laterally from one another.

The forward end of the first rail is farther forward than the forward end of the second rail, and the aft end of the second rail is farther aft than the aft end of the first rail.

The second ski skag includes third and fourth longitudinal rails adapted to be disposed on the bottom surface of a second ski. The third and fourth rails are spaced apart laterally from one another.

The forward end of the third rail is farther forward than the forward end of the fourth rail, and the aft end of the fourth rail is farther aft than the aft end of the third rail.

The kit may include a first carrier platform adapted to be attached to the bottom of the first ski, with the first and second rails attached to the bottom of the first carrier platform. Likewise, the kit may include a second carrier platform adapted to be attached to the bottom of the second ski, with the third and fourth rails attached to the bottom of the second carrier platform.

The aft end of the first rail may be at least as far forward as the forward end of the second rail. Likewise, the aft end of the third rail may be at least as far forward as the forward end of the fourth rail.

The aft end of the first rail may be farther forward than the forward end of the second rail. The aft end of the third rail may be farther forward than the forward end of the fourth rail.

At least one of the first and second rails may have a keel thereon, and at least one of the third and fourth rails may have a keel thereon. At least one of the first and second rails may have a hard-surface weld disposed thereon, and at least one of the third and fourth rails may have a hard-surface weld thereon.

The first and second skags may constructed such that when they are in an in-use configuration, i.e. mounted on the skis of a vehicle, the second and fourth rails are outboard from the first and third rails.

An exemplary embodiment of a ski assembly in accordance with the principles of the claimed invention includes first and second skis, with first and second ski skags disposed thereon, respectively.

The first ski skag includes first and second longitudinal rails disposed on the bottom of the first ski. The first and second rails are spaced apart laterally from one another.

The forward end of the first rail is farther forward than the forward end of the second rail, and the aft end of the second rail is farther aft than the aft end of the first rail.

The second ski skag includes third and fourth longitudinal rails disposed on the bottom surface of the second ski. The third and fourth rails are spaced apart laterally from one another.

The forward end of the third rail is farther forward than the forward end of the fourth rail, and the aft end of the fourth rail is farther aft than the aft end of the third rail.

The first skag may include a first carrier platform adapted to be attached to the bottom of the first ski, with the first and second rails attached to the bottom of the first carrier platform. Likewise, the second skag may include a second carrier platform adapted to be attached to the bottom of the second ski, with the third and fourth rails attached to the bottom of the second carrier platform.

The aft end of the first rail may be at least as far forward as the forward end of the second rail. Likewise, the aft end of the third rail may be at least as far forward as the forward end of the fourth rail.

The aft end of the first rail may be farther forward than the forward end of the second rail. The aft end of the third rail may be farther forward than the forward end of the fourth rail.

The first and second skags may constructed such that the arrangement of the first and second rails is a mirror reverse of the arrangement of the third and fourth rails.

At least one of the first and second rails may have a keel thereon, and at least one of the third and fourth rails may have a keel thereon. At least one of the first and second rails may have a hard-surface weld disposed thereon, and at least one of the third and fourth rails may have a hard-surface weld thereon.

The first and second skags may be constructed such that the second and fourth rails are outboard from the first and third rails.

An exemplary embodiment of a vehicle in accordance with the principles of the claimed invention includes first and second skis, with first and second ski skags disposed thereon, respectively.

The first ski skag includes first and second longitudinal rails disposed on the bottom of the first ski. The first and second rails are spaced apart laterally from one another.

The forward end of the first rail is farther forward than the forward end of the second rail, and the aft end of the second rail is farther aft than the aft end of the first rail.

The second ski skag includes third and fourth longitudinal rails disposed on the bottom surface of the second ski. The third and fourth rails are spaced apart laterally from one another.

The forward end of the third rail is farther forward than the forward end of the fourth rail, and the aft end of the fourth rail is farther aft than the aft end of the third rail.

The first skag may include a first carrier platform adapted to be attached to the bottom of the first ski, with the first and second rails attached to the bottom of the first carrier platform. Likewise, the second skag may include a second carrier platform adapted to be attached to the bottom of the second ski, with the third and fourth rails attached to the bottom of the second carrier platform.

The aft end of the first rail may be at least as far forward as the forward end of the second rail. Likewise, the aft end of the third rail may be at least as far forward as the forward end of the fourth rail.

The aft end of the first rail may be farther forward than the forward end of the second rail. The aft end of the third rail may be farther forward than the forward end of the fourth rail.

The first and second skags may constructed such that the arrangement of the first and second rails is a mirror reverse of the arrangement of the third and fourth rails.

At least one of the first and second rails may have a keel thereon, and at least one of the third and fourth rails may have a keel thereon. At least one of the first and second rails may have a hard-surface weld disposed thereon, and at least one of the third and fourth rails may have a hard-surface weld thereon.

The first and second skags may constructed such that the second and fourth rails are outboard from the first and third rails.

A method of improving maneuverability for a ski in accordance with the principles of the present invention includes the step of disposing a ski skag on the ski. The skag includes first and second longitudinal rails disposed on the bottom surface of the ski. The first and second rails are spaced apart laterally. The forward end of the first rail is farther forward than the forward end of said second rail, and the aft end of the second rail is farther aft than the aft end of the first rail.

The skag may include a carrier platform adapted to be attached to the bottom surface of the ski, with the first and second rails being disposed on the bottom surface of the first carrier platform so as to be disposed on the bottom surface of the ski.

The aft end of the first rail may be at least as far forward as the forward end of the second rail.

The aft end of the first rail may be farther forward than the forward end of the second rail.

At least one of the first and second rails may include a keel disposed thereon.

A method of improving durability of a ski in accordance with the principles of the present invention includes the step of disposing a ski skag on the ski. The skag includes first and second longitudinal rails disposed on the bottom surface of the ski. The first and second rails are spaced apart laterally. The forward end of the first rail is farther forward than the forward end of said second rail, and the aft end of the second rail is farther aft than the aft end of the first rail.

The skag may include a carrier platform adapted to be attached to the bottom surface of the ski, with the first and second rails being disposed on the bottom surface of the first carrier platform so as to be disposed on the bottom surface of the ski.

The aft end of the first rail may be at least as far forward as the forward end of the second rail.

The aft end of the first rail may be farther forward than the forward end of the second rail.

The first rails may include a keel disposed thereon. The rails may include a hard-surface weld thereon.

BRIEF DESCRIPTION OF THE DRAWINGS

Like reference numbers generally indicate corresponding elements in the figures.

DETAILED DESCRIPTION OF THE PREFERRED EMBODIMENT

Figure 6:
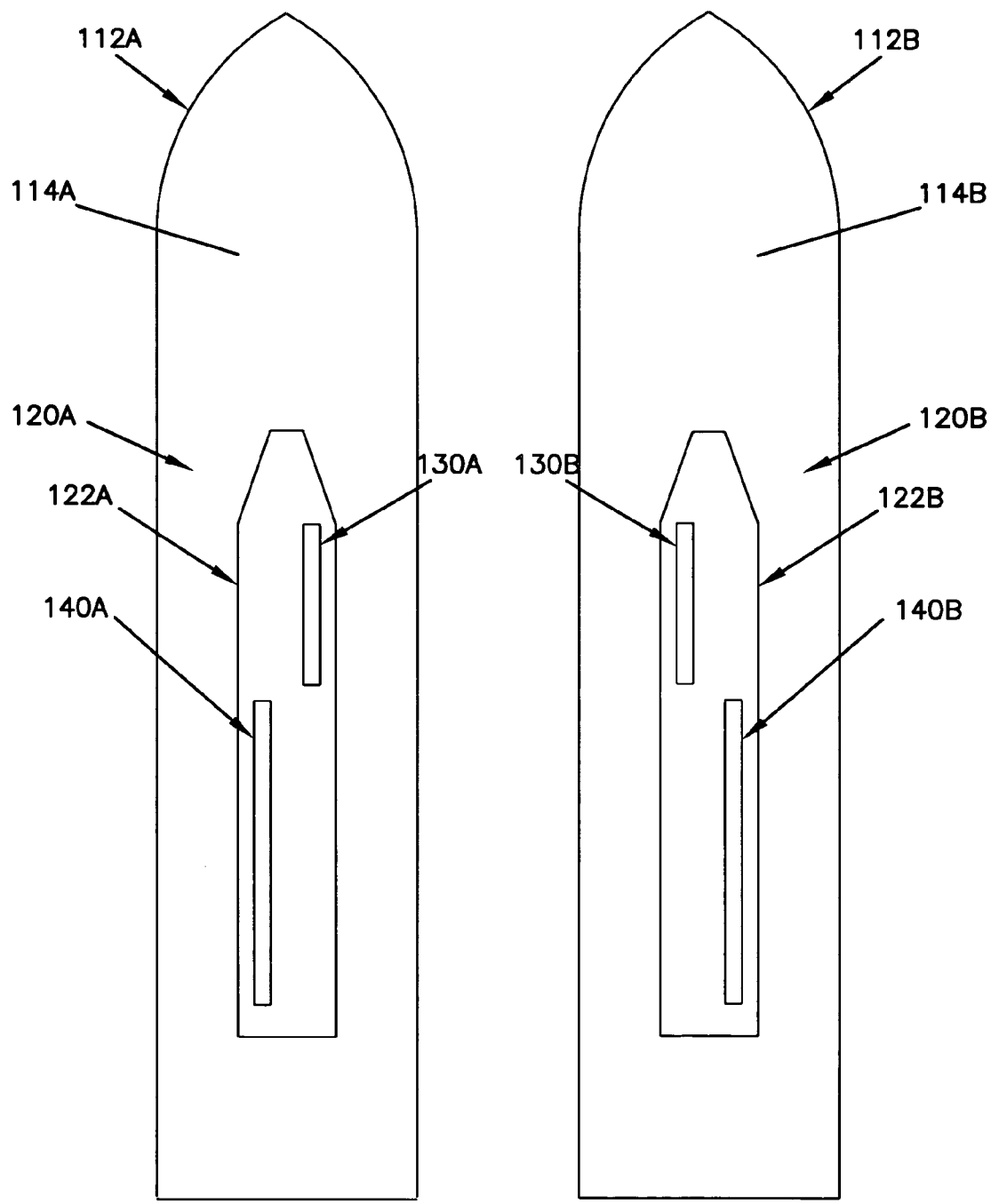
FIG. 6 is a bottom view of a pair of exemplary skis in accordance with the principles of the present invention.

A pair of skis 112A and 112B in accordance with the principles of the claimed invention is shown in FIG. 6. Skags 120A and 120B are visible on the bottom surfaces 114A and 114B of the skis 112A and 112B. Although other illustrations provide greater detail regarding the structure of the skags 120A and 120B, FIG. 6 shows the overall appearance of an exemplary embodiment thereof. The skis 112A and 112B and skags 120A and 120B are shown arranged in an in-use configuration. An in-use configuration is one wherein the skis 110A and 110B may be put to use, i.e. connected to a vehicle, incorporated into a ski assembly, etc. However, the particular configuration shown is exemplary, and other configurations may be equally suitable.

In addition, although the skis 112A and 112B and skags 120A and 120B in FIG. 6 form a pair, this is exemplary only. For certain applications, it may be equally suitable to use skis singly, or in groups of three or more.

Figure 7:
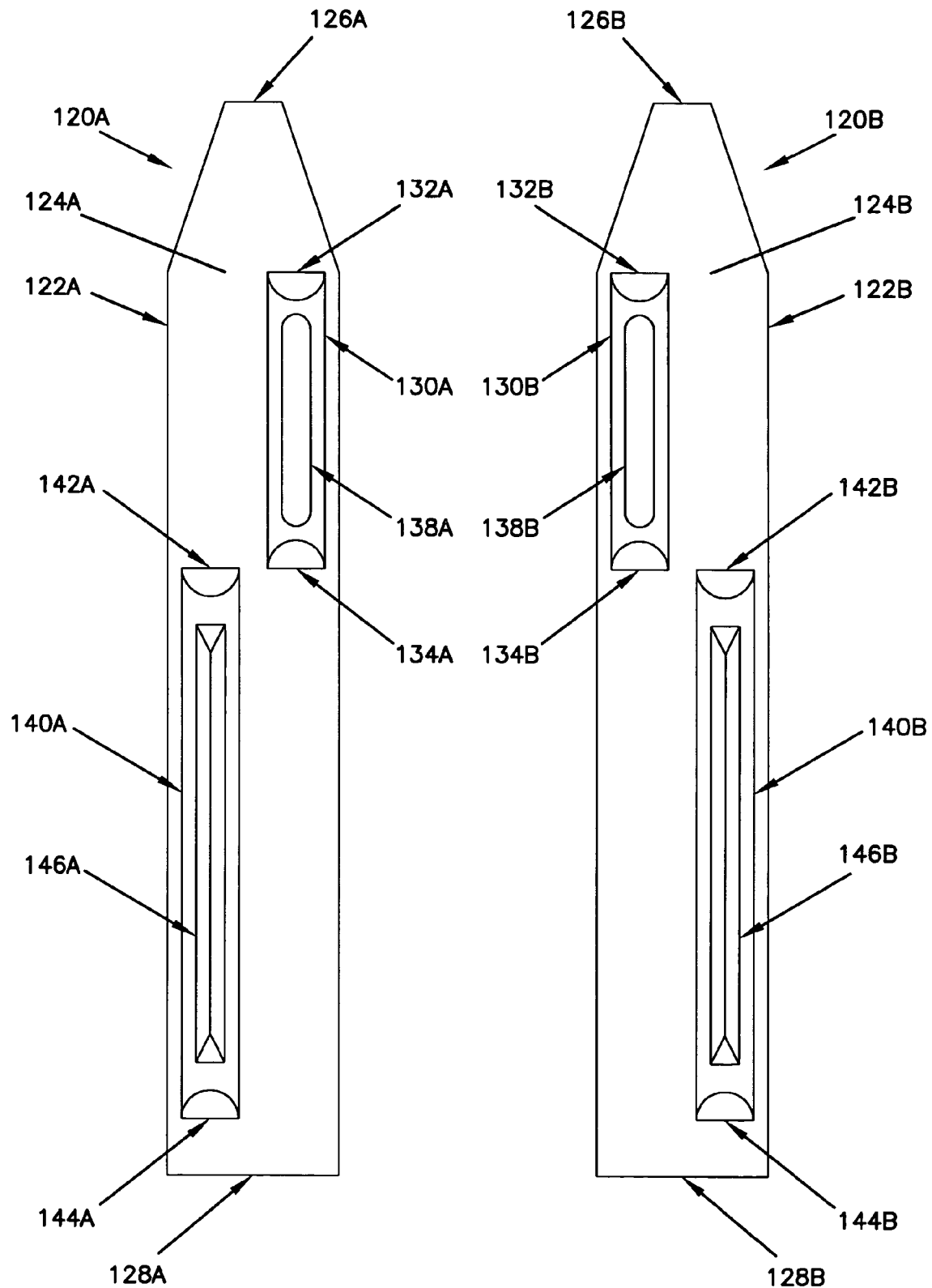
FIG. 7 is a bottom view of a pair of exemplary ski skags in accordance with the principles of the present invention, wherein the rails on each skag have zero overlap.

Referring to FIG. 7, the first and second skags 120A and 120B may include first and second carrier platforms 122A and 122B, respectively.

As illustrated therein, the carrier platforms 122A and 122B are flat longitudinal plates. However, this is exemplary only. A variety of shapes and configurations for the carrier platforms 122A and 122B may be equally suitable. In particular, suitable shapes include but are not limited to curved shapes, so that the carrier platforms 122A and 122B may conform to a curved ski.

Likewise, although the carrier platforms 122A and 122B are illustrated to have a particular footprint, i.e. narrower at one end, this also is exemplary only. Other shapes and configurations for the carrier platforms 122A and 122B may be equally suitable.

The carrier platforms 122A and 122B each have a bottom surface 124A and 124B.

The first skag 120A includes first and second rails 130A and 140A disposed on the bottom surface 124A of the first carrier platform 122A, and spaced apart laterally from one another. The first and second rails 130A and 140A extend longitudinally in a direction corresponding to the length of the ski 112A to which the first skag 120A is to be attached. This arrangement may be seen from FIG. 6.

Returning to FIG. 7, the first rail 130A is defined by a forward end 132A, which is the end nearer the forward end 126A of the first skag 120A, and an aft end 134A, which is the end nearer the aft end 128A of the first skag. Similarly, the second rail 140A is defined by a forward end 142A and an aft end 144A. As may be seen, the forward end 132A of the first rail 130A is farther forward than the forward end 142A of the second rail 140A, and the aft end 144A of the second rail 140A is farther aft than the aft end 134A of the first rail 130A.

In other words, the first and second rails 130A and 140A are staggered or offset from one another longitudinally, such that they do not completely overlap one another along the length of the first skag 120A.

Similarly, the second skag 120B includes third and fourth rails 130B and 140B disposed on the bottom surface 124B of the second carrier platform 122B, and spaced apart laterally from one another. The third and fourth rails 130B and 140B extend longitudinally in a direction corresponding to the length of the ski 112B to which the second skag 120B is to be attached.

As with the first and second rails 130A and 140A, the third rail 130B is defined by a forward end 132B, which is the end nearer the forward end 126B of the second skag 120B, and an aft end 134B, which is the end nearer the aft end 128B of the second skag. Similarly, the fourth rail 140B is defined by a forward end 142B and an aft end 144B. The forward end 132B of the third rail 130B is farther forward than the forward end 142B of the fourth rail 140B, and the aft end 144B of the fourth rail 140B is farther aft than the aft end 134B of the third rail 130B.

Thus, the third and fourth rails 130B and 140B also are staggered such that they do not completely overlap one another along the length of the second skag 120B.

In the arrangement shown in FIG. 7, the first and second rails 130A and 140A have zero overlap. That is, the aft end 134A of the first rail 130A is aligned with the forward end 142A of the second rail 140A, so that the aft end 134A of the first rail 130A is as far forward as the forward end 142A of the second rail 140A. Likewise, the third and fourth rails 130B and 140B have zero overlap. The aft end 134B of the third rail 130B is aligned with the forward end 142B of the fourth rail 140B, so that the aft end 134B of the third rail 130B is as far forward as the forward end 142B of the fourth rail 140B.

However, such an arrangement is exemplary only. Other arrangements may be equally suitable.

Figure 9:
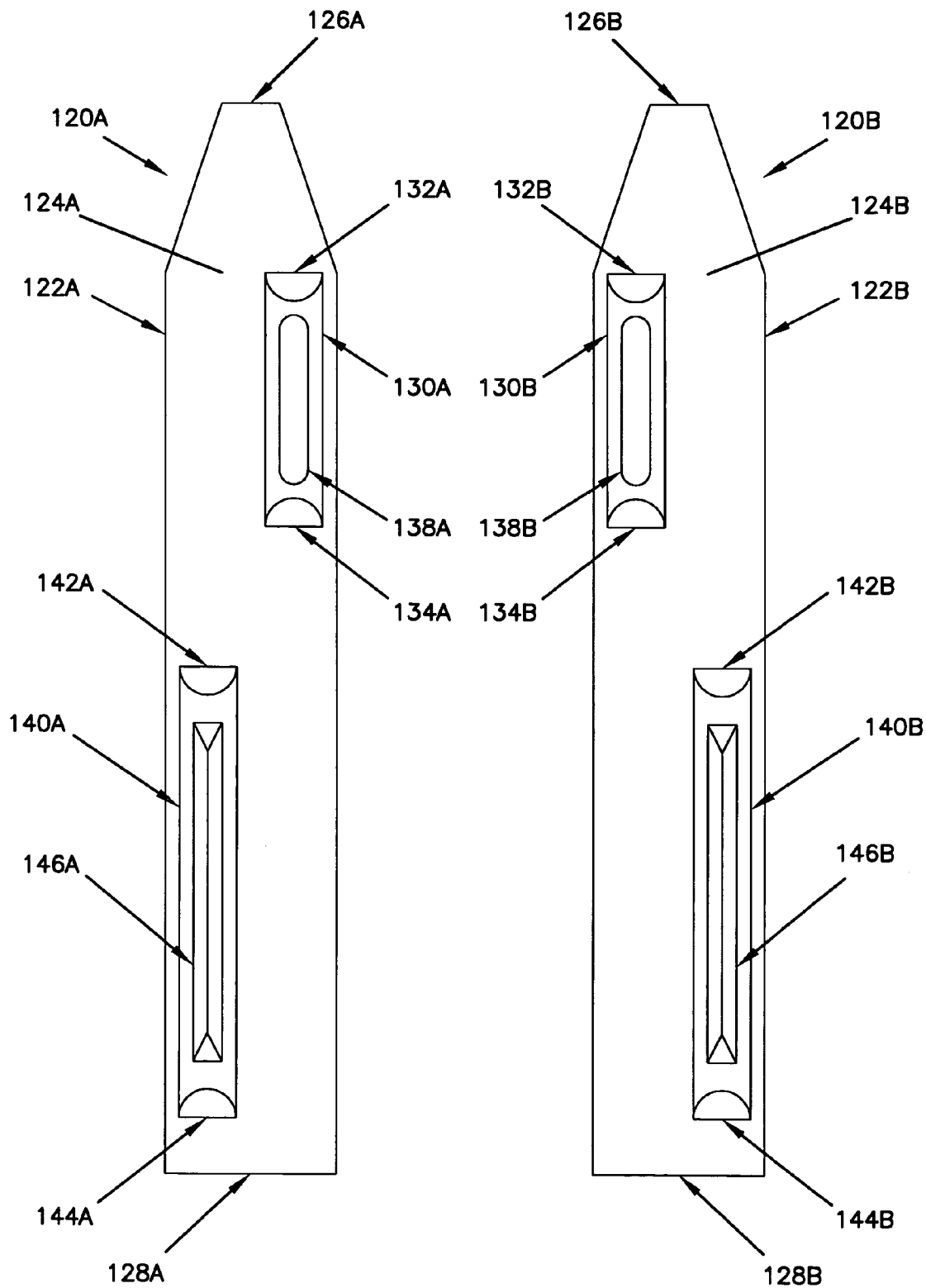
FIG. 9 is a bottom view of another pair of exemplary ski skags in accordance with the principles of the present invention, wherein the rails on each skag have a negative overlap.

For example, as shown in FIG. 9 the aft end 134A of the first rail 130A may be farther forward than the forward end 142A of the second rail 140A. Likewise, the aft end 134B of the third rail 130B may be farther forward than the forward end 142B of the fourth rail 140B. That is, the rails may be arranged along the length of the skag so that they are spaced apart longitudinally from one another. Such an arrangement may be considered to constitute "negative overlap" of the rails.

Figure 10:
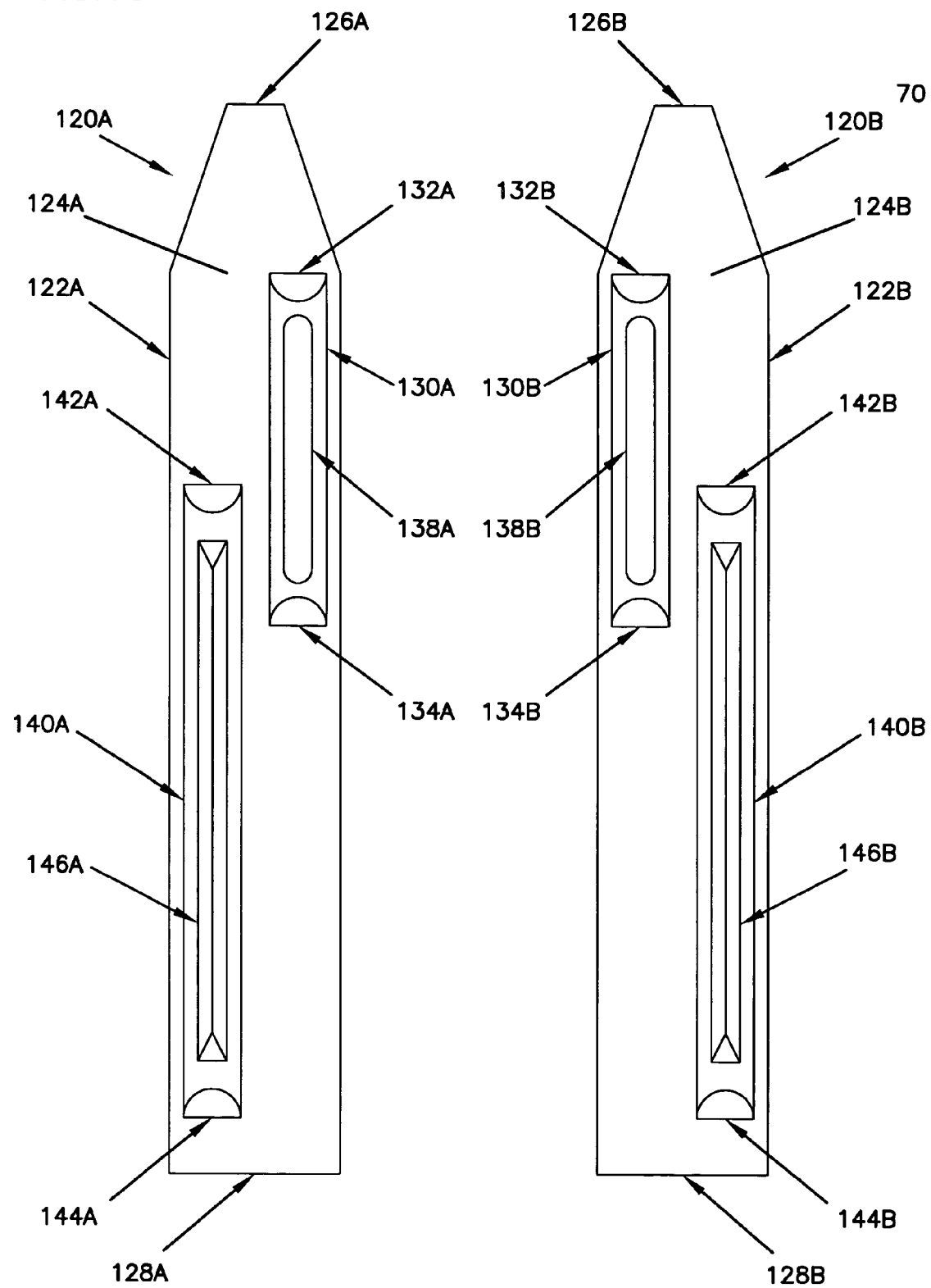
FIG. 10 is a bottom view of still another pair of exemplary ski skags in accordance with the principles of the present invention, wherein the rails on each skag have a positive overlap.

In addition, as shown in FIG. 10, the aft end 134A of the first rail 130A may be farther aft than the forward end 142A of the second rail 140A. Likewise, the aft end 134B of the third rail 130B may be farther aft than the forward end 142B of the fourth rail 140B. That is, the rails may be arranged along the length of their respective skag so that some portion of the first and second rails 130A and 140A overlap, and/or some portion of the third and fourth rails 130B and 140B overlap.

Thus, the first and second rail 130A and 140A may overlap partially, they may have no longitudinal gap therebetween without overlapping, or they may have a longitudinal gap therebetween, and likewise the third and fourth rails 130B and 140B.

Although the preceding discussion deals with the case wherein the skags 120A and 120B include carrier platforms 122A and 122B, this is exemplary only. It may be equally suitable to attach rails to one or more skis without a carrier platform.

In addition, it is pointed out that it is not necessary for the first and second rails 130A and 140A to extend the entire length of the first carrier platform 122A, either singly or together. That is, some portion of the length of the first carrier platform 122A may not have either the first rail 130A or the second rail 140A disposed thereon. This may be seen for example from FIGS. 7, 9, and 10, in which portions of the first carrier platform 122A near both the forward end 126A and the aft end 128A do not have either the first rail 130A or the second rail 140A disposed thereon. Additionally, FIG. 10 shows a case wherein there is also a middle portion of the first carrier platform 122A that does not have either the first rail 130A or the second rail 140A disposed thereon.

Similarly, it is not necessary for the third and fourth rails 130B and 140B to extend the entire length of the second carrier platform 122B, either singly or together.

As previously described, the first and second rails 130A and 140A are spaced apart laterally from one another, and the third and fourth rails 130B and 140B are also spaced apart laterally from one another.

Figure 8:
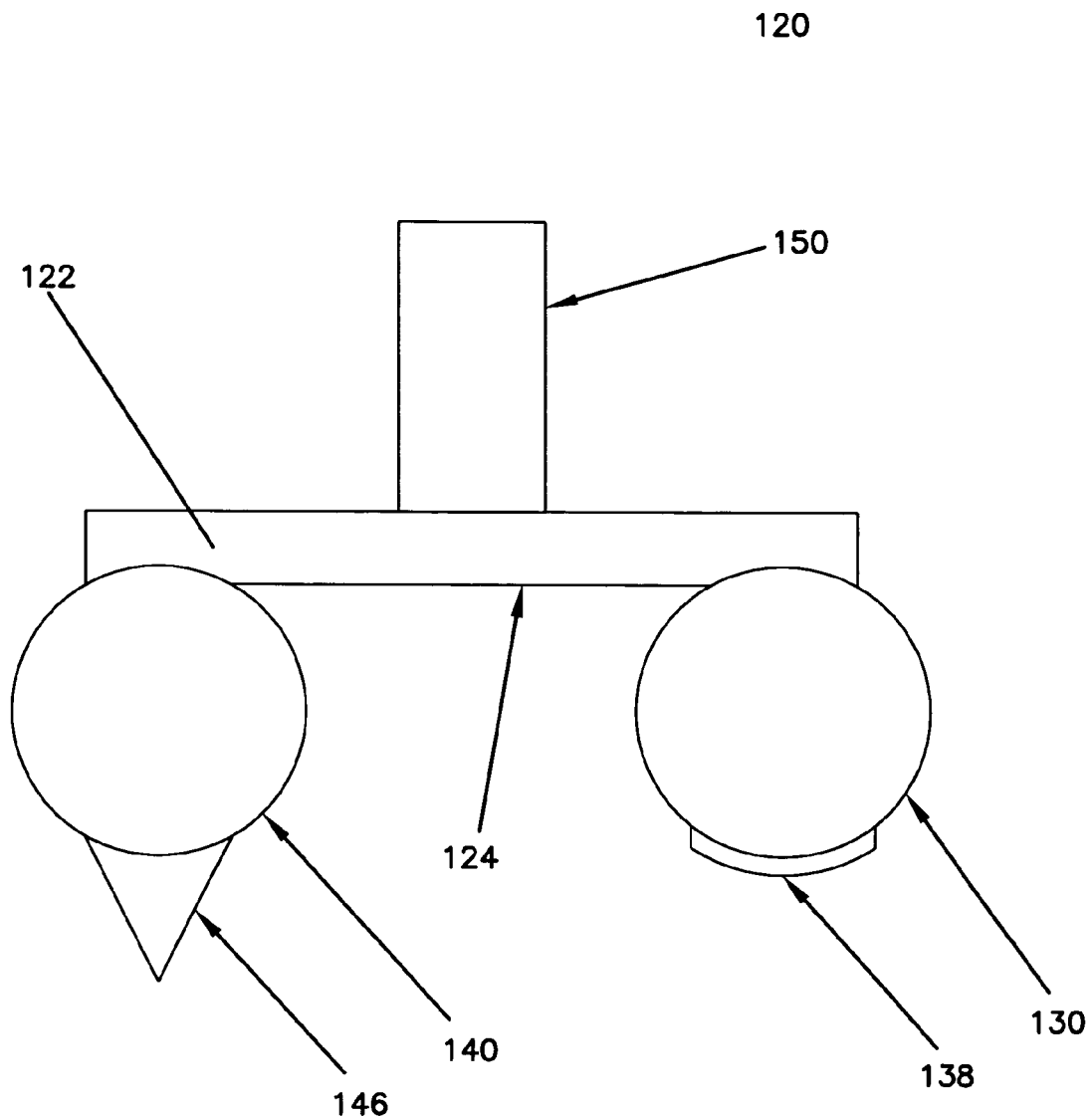
FIG. 8 is a cross-sectional view of an exemplary ski skag in accordance with the principles of the present invention.

As is most easily visible from FIG. 8, in certain embodiments the rails 130 and 140 of a skag 120 may be spaced apart laterally such that at least some portion of the rails 130 and 140 extend laterally outward past the edges of the carrier platform 122. However, this is exemplary only.

At least one of the rails 130, 140 on a given skag 120 may include a keel 146 thereon. In the exemplary embodiment shown therein, a keel 146 is disposed on the second rail 140. The keel 146 therein extends longitudinally along the second rail 140.

FIGS. 7, 9, and 10 show a similar arrangement from a different view. Therein, the second and fourth rails 140A and 140B have a keels 146A and 146B disposed thereon. However, as also may be seen therein, the keels 146A and 146B do not necessarily run the entire length of the second and fourth rails 140A and 140B.

The keels may run the entire length of the rails on which they are disposed, although this is not required. The total length of the keels 146A and 146B may vary considerably.

Although in the embodiments shown keels are disposed on the second and fourth rails 140A and 140B, this is exemplary only. Keels may be present on any or all of the rails of a particular skag. In addition, for certain embodiments it may be suitable to exclude the keels altogether.

Returning to FIG. 8, the keel 146 projects downwards from the second rail 140, so as to provide grip between the skag (and consequently the ski and the vehicle as a whole) and the surface over which the vehicle travels. As illustrated, the keel 146 has a wedge shaped cross section, with the narrow end of the wedge shape oriented downward from the carrier platform 22. However, this is exemplary only, and other shapes for keels may be equally suitable. In particular, suitable shapes for providing grip with the surface include, but not limited to, rectangular cross sections and narrow blades.

The keel 146 preferably is made from a relatively hard material. This provides a good grip between keel 146 and the surface over which the vehicle passes, and provides durability for the keel 146 in extended use. Materials such as metal carbides, including but not limited to tungsten carbide, are well suited for use in the keel 146. However, this is exemplary only, and other materials may be equally suitable.

Figure 16:
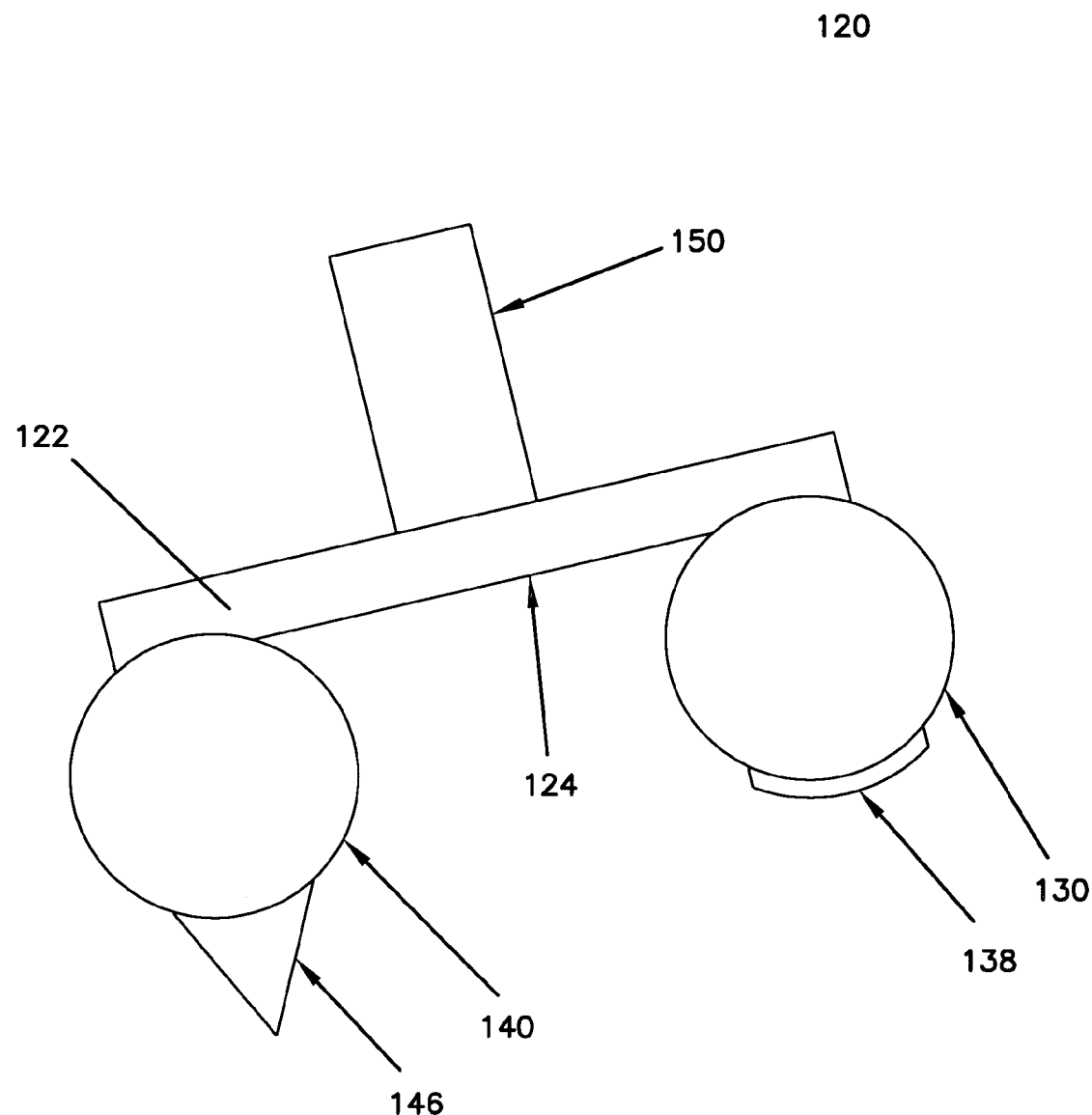
FIG. 16 is a cross-sectional view of the ski skag of FIG. 8, angled as in a turn.

FIG. 16 shows a skag 120 similar to that in FIG. 8, but angled to the left as though mounted on a vehicle that is turning to the left.

Figure 1:
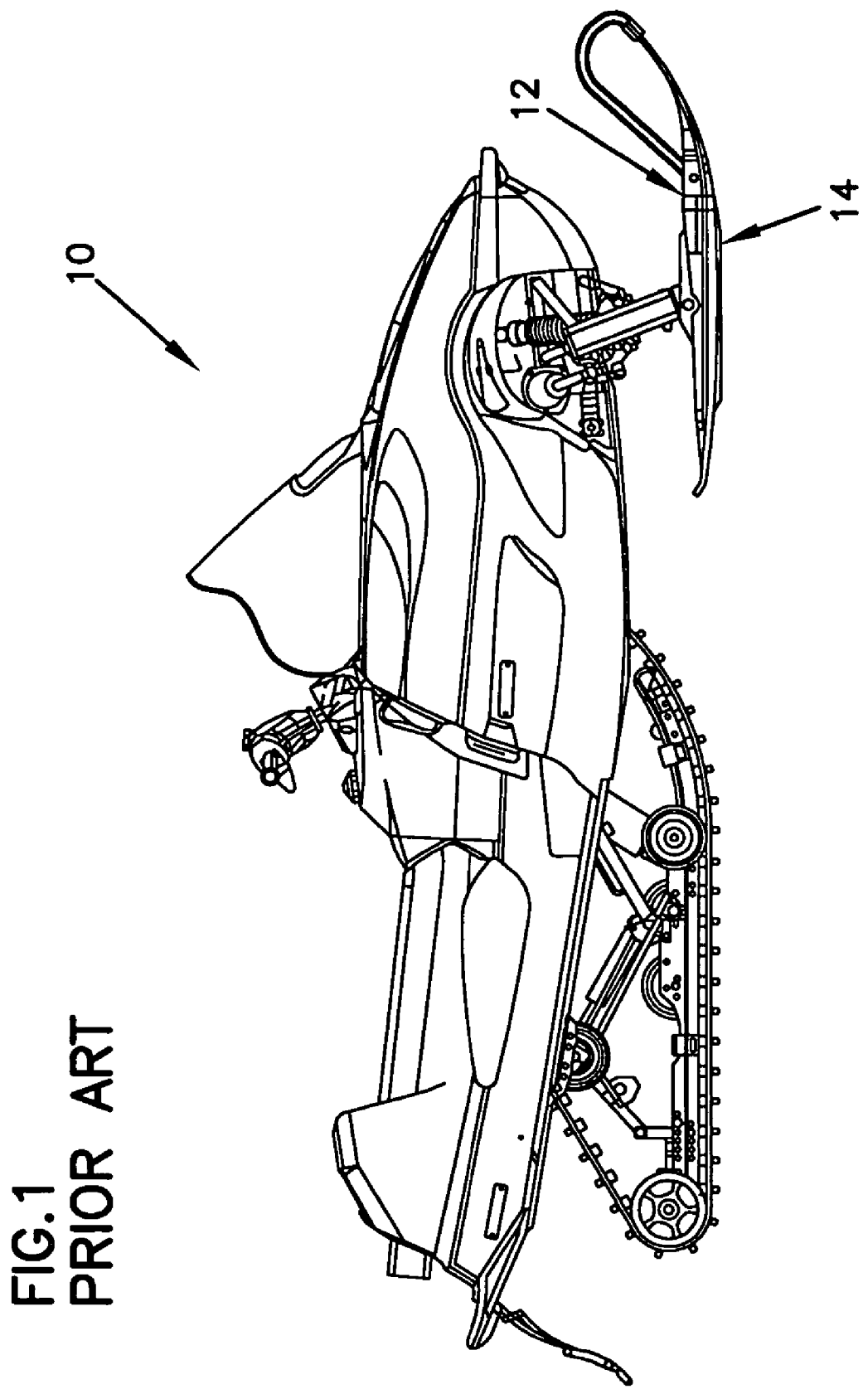
FIG. 1 is an illustration of a snowmobile with conventional skis, as known from the prior art.
Figure 2:
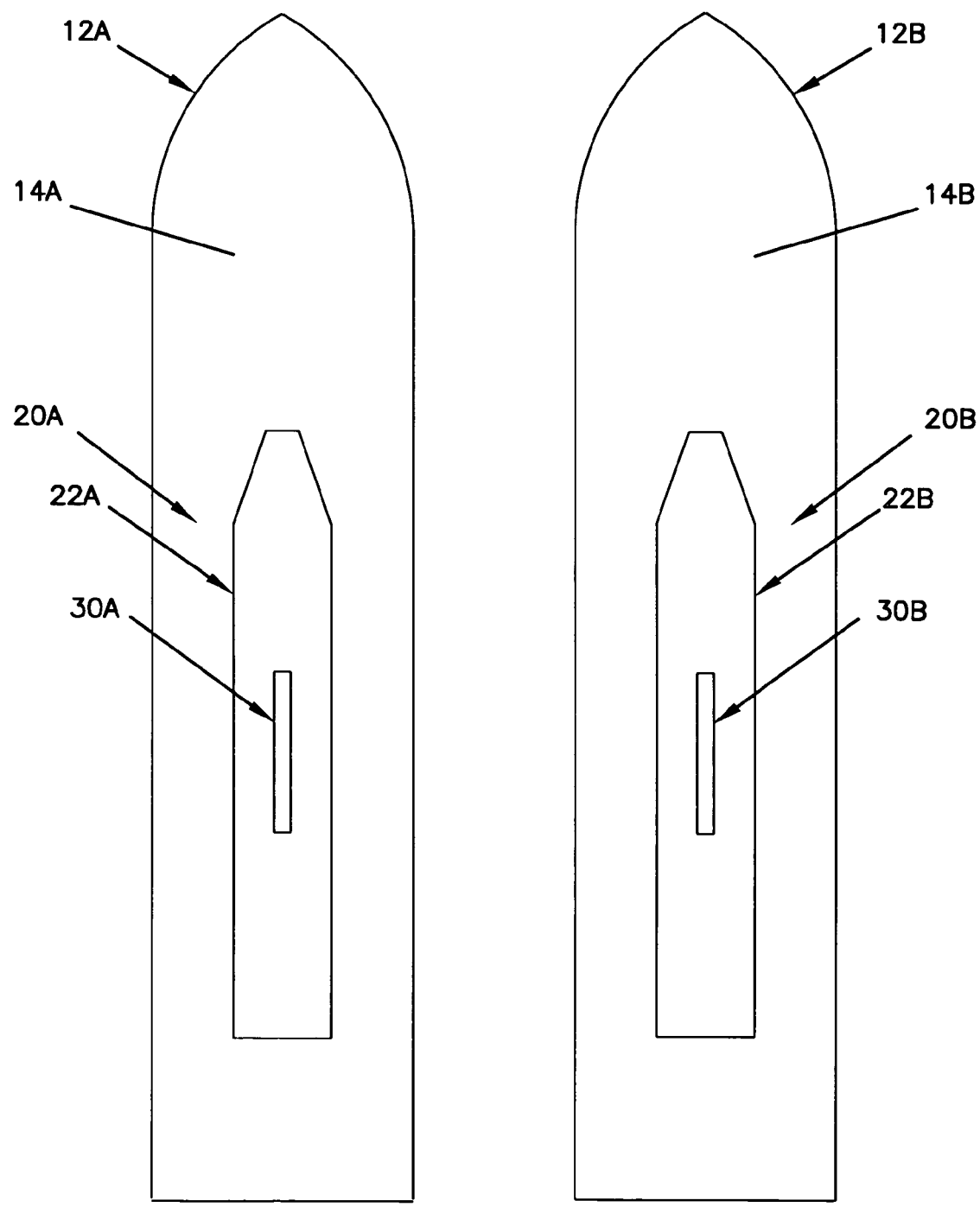
FIG. 2 is a bottom view of a pair of conventional skis, as known from the prior art.
Figure 3:
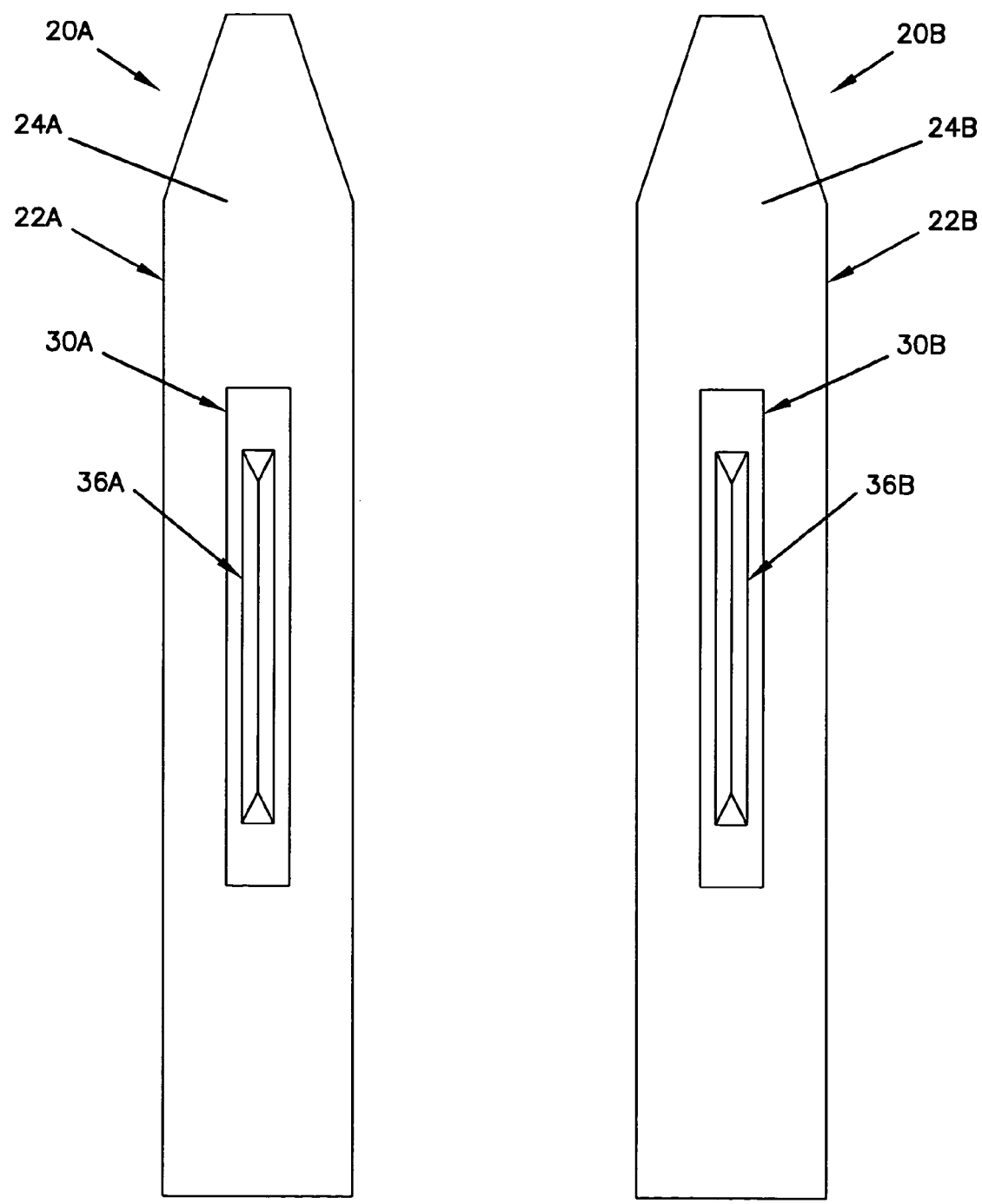
FIG. 3 is a bottom view of a pair of conventional ski skags, as known from the prior art.
Figure 4:
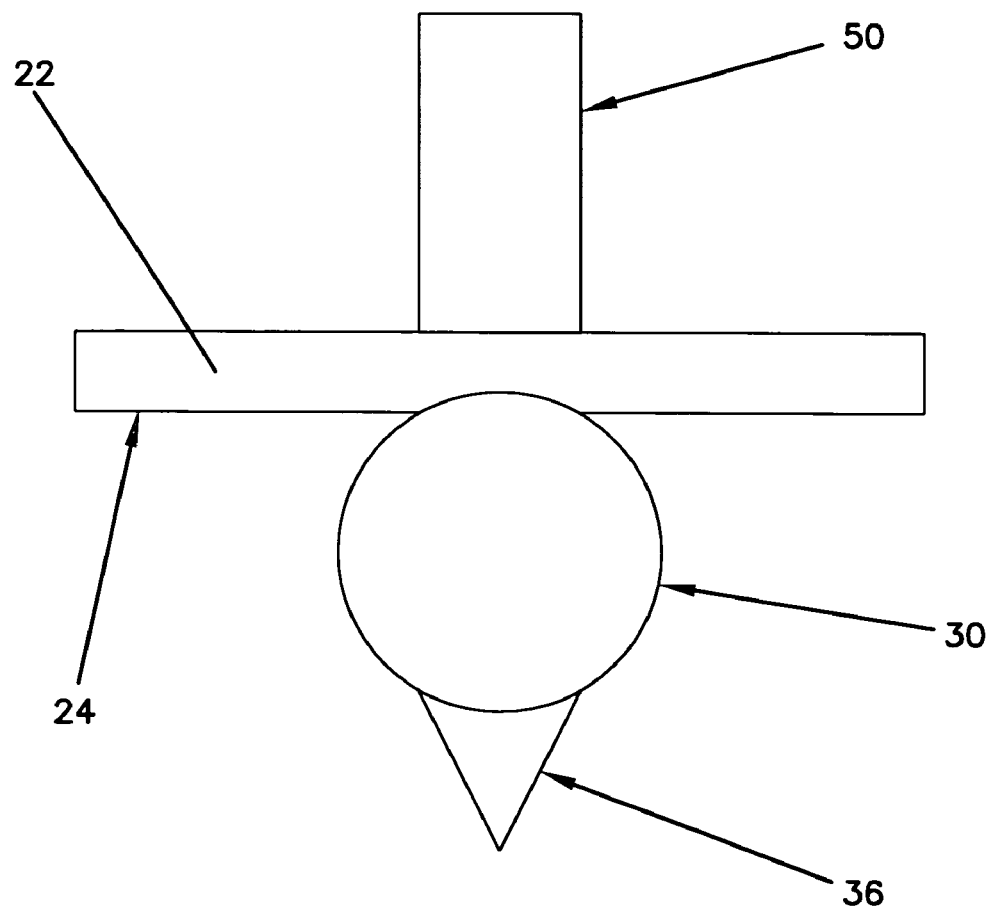
FIG. 4 is a cross-sectional view of a conventional ski skag, as known from the prior art.
Figure 5:
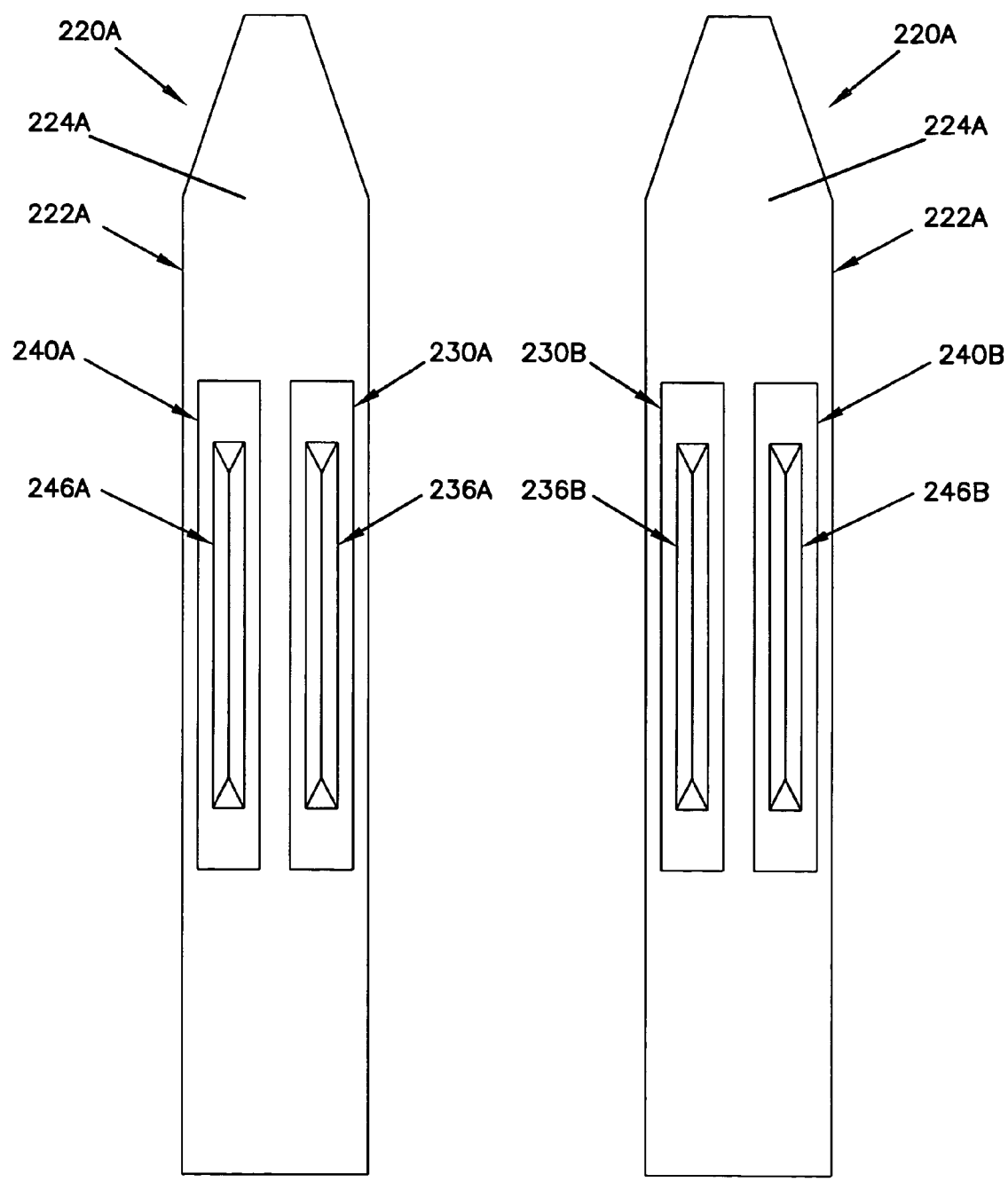
FIG. 5 is a bottom view of a pair of exemplary dual ski skags.

As previously noted, in a conventional skag 20 like that shown in FIG. 4, the centrally disposed rail 30 and keel 36 may be lifted at least partially out of contact with the underlying surface if so tilted.

However, the skag 120 in FIGS. 8 and 16 has the second rail 140 and its keel 146 offset to the left of the center of the skag 120, the second rail 140 and the keel 146. As previously noted, the first and second rails 130 and 140 may be spaced apart to such a degree that one or both of the first and second rails 130 and 140 extends past the edges of the carrier platform 124.

If the skag 120 is tilted as in FIG. 16, the second rail 140 and the keel 146 may be lifted less than in a conventional skag 20, or not lifted at all. Indeed, depending on factors such as the width and orientation of the ski to which it is attached, the second rail 140 and the keel 146 actually may be depressed, so as to be forced into greater contact with the underlying surface when the vehicle to which the skag 120 is attached turns.

In the embodiment illustrated in FIGS. 8 and 16, there is a keel 146 only on the second rail 140. Thus when the skag 120 is tilted to the right for right turns, the keel 146 may not contribute to improving maneuverability as described above. However, the arrangement illustrated in FIGS. 8 and 16 is exemplary only. It may be equally suitable for the first rail 130 to include a keel in addition to or instead of the keel 146 on the second rail 140.

If the skag 120 shown in FIGS. 8 and 16 were used with another skag having a similar structure but a mirror-reversed arrangement, as shown in FIGS. 7, 9, and 10, the second rail 140A with its keel 146A and the fourth rail 140B with its keel 146B are both outboard from the first and third rails 130A and 130B.

As may be seen from FIGS. 7, 9, and 10, in a mirror-reversed arrangement the first and third rails 130A and 130B are aligned longitudinally, and likewise the second and fourth rails 140A and 140B are aligned longitudinally. In addition, the first rail 130A is offset laterally from the centerline of the arrangement of skags 130A and 130B by the same distance as the third rail 130B, but in the opposite direction. Likewise the second rail 140A and fourth rails 140B are offset from the centerline by the same distance in opposite directions.

Given such a mirror-reversed arrangement, one of the skags 120A and 120B of such a pair would be angled as described above with respect to FIG. 16 in any turn, regardless of whether the vehicle turns right or left.

However, although an arrangement of skags 120A and 120B that are mirror-reverses of one another as shown may be advantageous for certain applications, it is exemplary only, and other arrangements may be equally suitable. Likewise, an arrangement wherein the second rail 140A and the fourth rail 140B are outboard from the first and third rails 130A and 130B is exemplary only, and other arrangements may be equally suitable.

In addition, although the embodiments illustrated herein show two rails on each skag, this is exemplary only, and embodiments having three or more rails per skag may be equally suitable.

Furthermore, although skis are illustrated in pairs herein, each with one skag thereon, this also is exemplary only. Certain embodiments of a skag in accordance with the principles of the present invention may be suitable for use with vehicles having more or fewer than two skis, and/or may be suitable for use on only one or a portion of the skis of a vehicle having two or more skis. Also, it may be equally suitable to have multiple skags on a ski, rather than one per ski as shown herein.

In addition to or instead of a keel 146, at least one of the rails 130, 140 on a given skag 120 may include a hard-surface weld 138 thereon. A hard-surface weld 138 is a weld applied to a piece of metal, wherein at least the surface of that weld is relatively hard. The hardness may be due to the composition of the welding compound, the conditions at which the weld is applied (i.e. temperature, welding method, ambient atmosphere, etc.), and/or other factors. Details for hard surface welds generally are known, and are not further described herein.

It is noted that although welding is commonly used to join together separate pieces of metal, that is not necessarily the case with a hard-surface weld 138 in the present invention. Although the hard-surface weld 138 may join two or more pieces of metal, it may also be applied to the surface of a single piece of metal. Thus, the presence of a hard-surface weld 138 does not imply that the rail 130 on which it is disposed necessarily is formed of two or more pieces.

In the exemplary embodiment shown in FIG. 8, a hard-surface weld 138 is disposed on the first rail 130. The hard-surface weld 138 therein extends longitudinally along the second rail 130.

FIGS. 7, 9, and 10 also show a similar arrangement from a different view. Therein, the first and third rails 130A and 130B have hard-surface welds 138A and 138B disposed thereon. However, as also may be seen therein, the hard-surface welds 138A and 138B do not necessarily run the entire length of the first and third rails 130A and 130B.

The hard-surface welds may run the entire length of the rails on which they are disposed, although this is not required. The total length of the hard-surface welds 138A and 138B may vary considerably.

Although in the embodiments shown hard-surface welds are disposed on the first and third rails 130A and 130B, this is exemplary only. Hard-surface welds may be present on any or all of the rails of a particular skag. In addition, for certain embodiments it may be suitable to exclude the hard-surface welds altogether.

Hard-surface welds serve to improve the durability of the skag. Returning to FIG. 8, the hard-surface weld 138 is arranged on the underside of the first rail 130, so as to make contact with the surface on which the first rail 130 rail rests. The hard-surface weld 138 typically is harder than the rail 130 on which it is disposed. Consequently, the hard-surface weld 138 may resist wear and damage better than the first rail 130 alone.

As illustrated, the hard-surface weld 138 is shaped so as to form a generally flat layer over a portion of the first rail 130. However, this is exemplary only, and hard-surface welds with other cross-sections may be equally suitable.

Likewise, although the hard-surface weld 138 shown in FIG. 8 extends around a portion of the first rail 130 equivalent to approximately 60 degrees of the circumference of the first rail 130, this is exemplary only. Hard-surface welds 138 may be wider or narrower than that shown.

Figure 12:
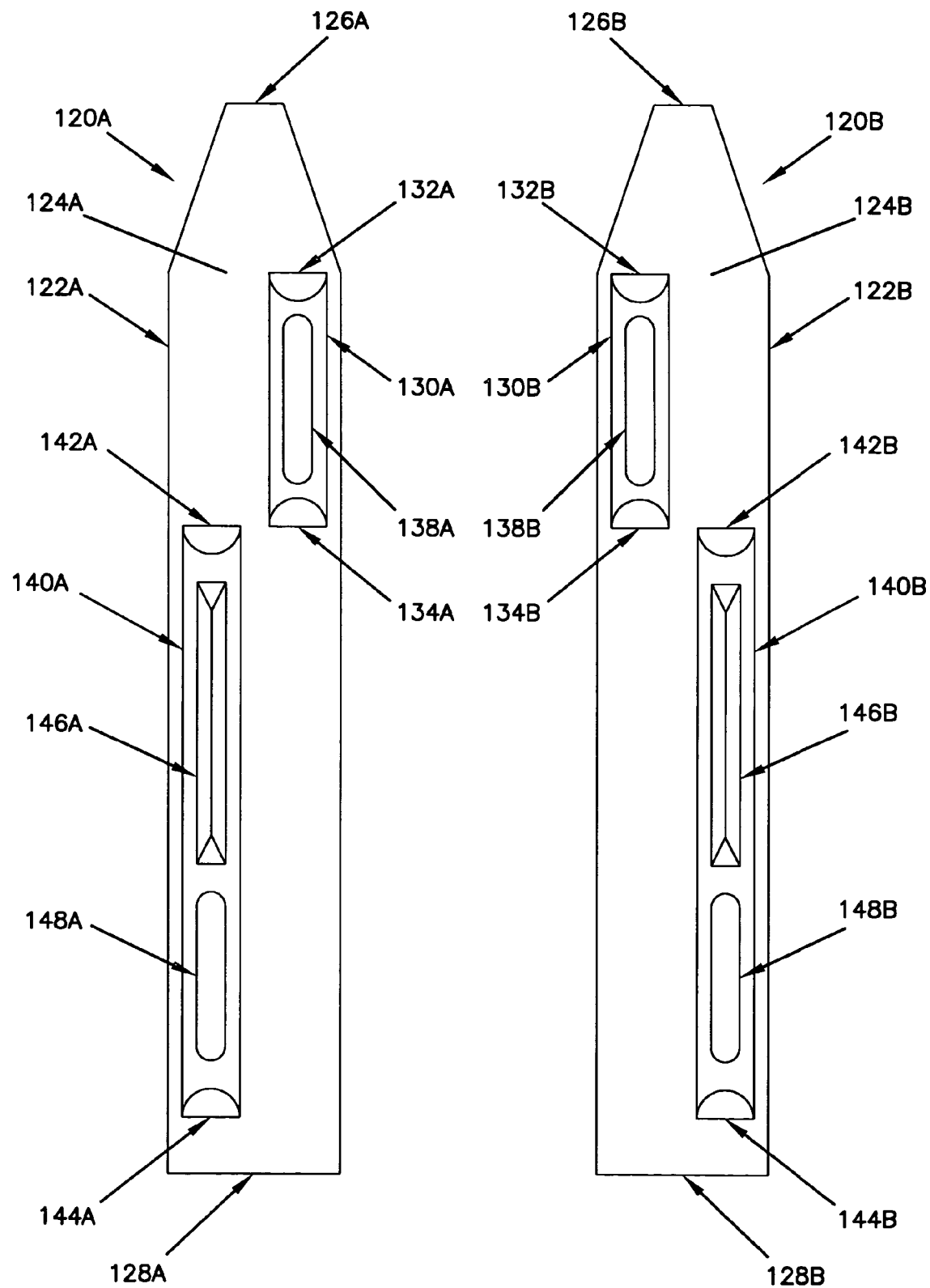
FIG. 12 is a bottom view of yet another pair of exemplary of ski skags in accordance with the principles of the present invention, wherein one rail on each skag includes both a keel and a hard-surface weld.

Any given rail on a skag may have a keel, a hard-surface weld, neither, or both. An exemplary embodiment of the latter is illustrated in FIG. 12. Therein, the first and third rails 130A and 130B have hard-surface welds 138A and 138B disposed thereon. The second and fourth rails 140A and 140B have keels 146A and 146B disposed thereon, and also have hard-surface welds 148A and 148B disposed thereon.

Figure 11:
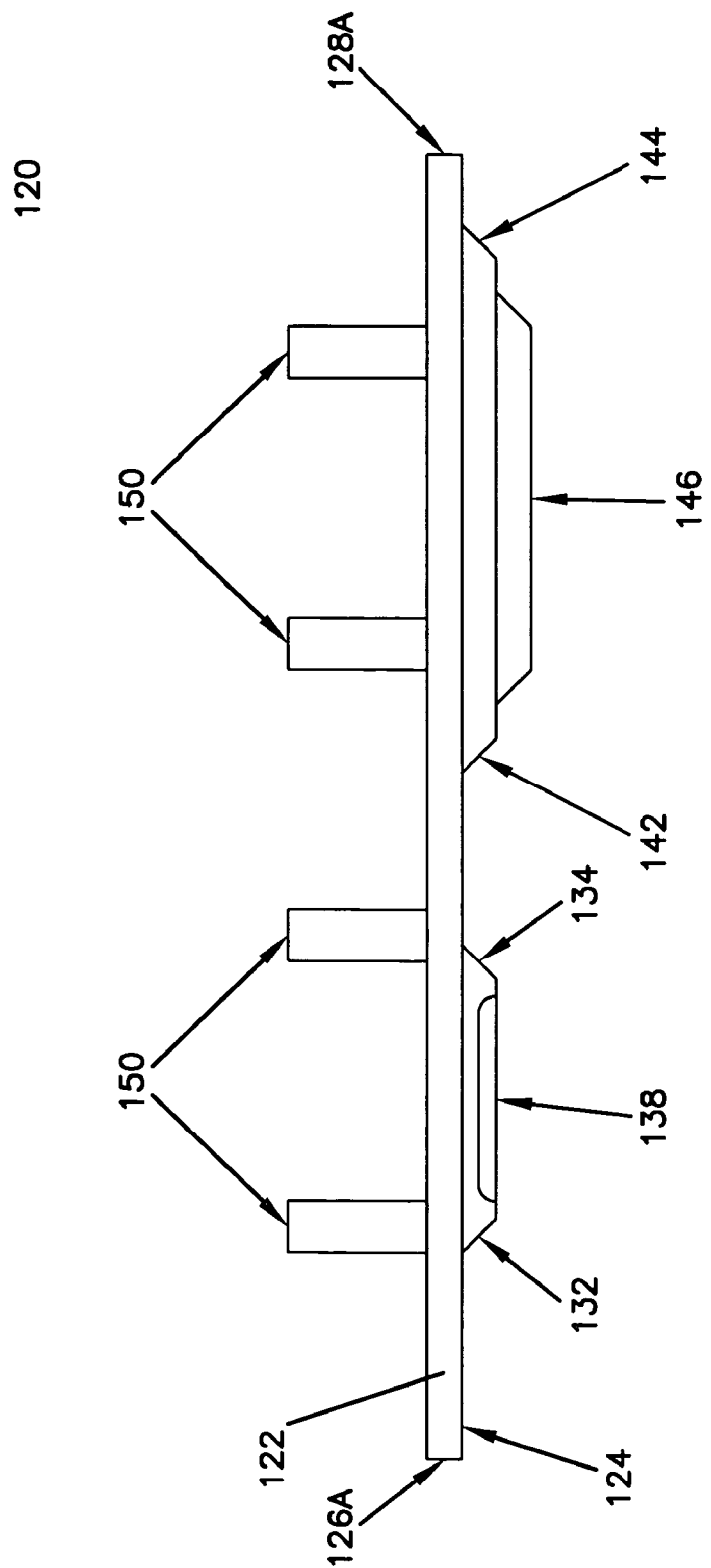
FIG. 11 is a side view of a skag from FIG. 9.

Turning to FIG. 11, in certain embodiments some or all of the rails 130, 140 of a skag 120 may be shaped so that their aft ends 134, 144 are flush with the carrier platform 122. As illustrated therein, the aft ends 134 and 144 are beveled, and intersect the flat lower side 124 of the carrier platform 122 at an angle. Similar beveling may be seen in FIGS. 7, 9, 10, and 12. As shown therein, both the forward ends 132A, 142A, 132B, and 142B and the aft ends 134A, 144A, 134B, and 144B are beveled. However, this is exemplary only, and other arrangements may be equally suitable.

With aft ends 134A, 144A, 134B, and 144B shaped as described and shown, the aft ends 134A, 144A, 134B, and 144B tend to at least partially smooth out the grooves left behind by the rails 130A, 140A, 130B, and 140B and keels 146A and 146B. In addition, the aft ends 134A, 144A, 134B, and 144B as shown and described do not include sharp corners or other features to cause unnecessary drag, or to interfere with maneuverability. However, the shapes shown in FIGS. 7, 9, 10, 11, and 12 are exemplary only. Forward ends 132A, 142A, 132B, and 142B and/or aft ends 134A, 144A, 134B, and 144B with other shapes that at least partially smooth out the grooves left behind by the rails 130A, 140A, 130B, and 140B and keels 146A and 146B may be equally suitable. Furthermore, aft ends 134A, 144A, 134B, and 144B with shapes that do not smooth out the grooves left behind by the rails 130A, 140A, 130B, and 140B and keels 146A and 146B may be equally suitable.

As illustrated in FIG. 8, the cross sections of the first and second rails 130 and 140 are in the shape of a circular segment. In the embodiment shown, the circular segment is nearly a complete circle, so that the first and second rails 130 and 140 are essentially round rods with a flat area by which they are affixed to the carrier platform 122.

A cross section in the shape of a circular segment may present relatively little drag when moved on and through materials over which the vehicle passes, such as snow and ice. Such a cross section also may be relatively unlikely to catch on surfaces or debris. In addition, a cross section free of sharp corners or other easily worn structures, such as one in the shape of a circular segment, may be less prone to wear.

However, such a shape is exemplary only, and shapes other than those shown may be equally suitable. In particular, first and second rails 130 and 140 with cross sections in the shape of smaller circular segments, such as a half circle, may be equally suitable. Furthermore, first and second rails 130 and 140 with cross sections having shapes that are not circular segments may be equally suitable.

The carrier platform 122 and the first and second rails 130 and 140 may be constructed of a material different than the ski to which they are to be attached. In particular, the carrier platform 122 and the first and second rails 130 and 140 may be constructed of a harder or more durable material.

For example, in a preferred embodiment the carrier platform 122 and the first and second rails 130 and 140 are constructed of metal. In a more preferred embodiment the carrier platform 122 and the first and second rails 130 and 140 are constructed of steel and/or aluminum.

However, this is exemplary only. A variety of other materials may be suitable for the carrier platform 122 and the first and second rails 130 and 140. In addition, it is not necessary that the carrier platform 122 and the first and second rails 130 and 140 be constructed of the same material. Furthermore, in certain embodiments it may be advantageous for the carrier platform 122 and the first and second rails 130 and 140 to be constructed of the same material as the skis. In particular, it is noted that vehicle skis may be made of steel, and that this does not preclude the use of steel in the carrier platform 122 or the first and second rails 130 and 140.

The skag 120 may be formed as a unitary piece. That is, the skag 120 may be constructed such that the components thereof are connected to one another so as to form essentially a single, solid part, without the need for fixtures such as screws, bolts, etc. For example, the skag 120 as shown in FIG. 8 may be made into a unitary structure by welding the first and second rails 130 and 140 to the carrier platform 122, and by likewise welding the keel 146 to the second rail 140. Alternatively, the skag 120 might be cast or otherwise formed as an integral piece, so that welding or other attachment steps are not required. Skags 120 having a unitary structure may be relatively strong and/or rigid. In addition, skags 120 having a unitary structure may be less prone to certain types of long term wear, since there are no separate parts to become loose, rub or vibrate against one another, etc. However, the arrangements described herein for producing a skag 120 with unitary construction are exemplary only; other such arrangements may be equally suitable. In addition, skags 120 that do not have unitary construction, i.e. which are composed of two or more separate parts, also may be equally suitable.

With regard to attaching a skag 120 to a ski, the skag 120 may include mounting rods 150. As illustrated in FIG. 11, the mounting rods 150 are connected to the carrier platform 122, and extend vertically upwards for some distance. Such mounting rods 150 may, for example, fit into matching holes in the ski. The mounting rods 150 may be held in place using a variety of means, including but not limited to fasteners. For example, in an exemplary embodiment the rods 150 may be threaded, and held in place with nuts. Alternatively, the rods 150 may be held in place with pins, screws, clamps, etc.

However, such an arrangement is exemplary only, and other means for attaching the skag 120 to a ski may be equally suitable.

Figure 13:
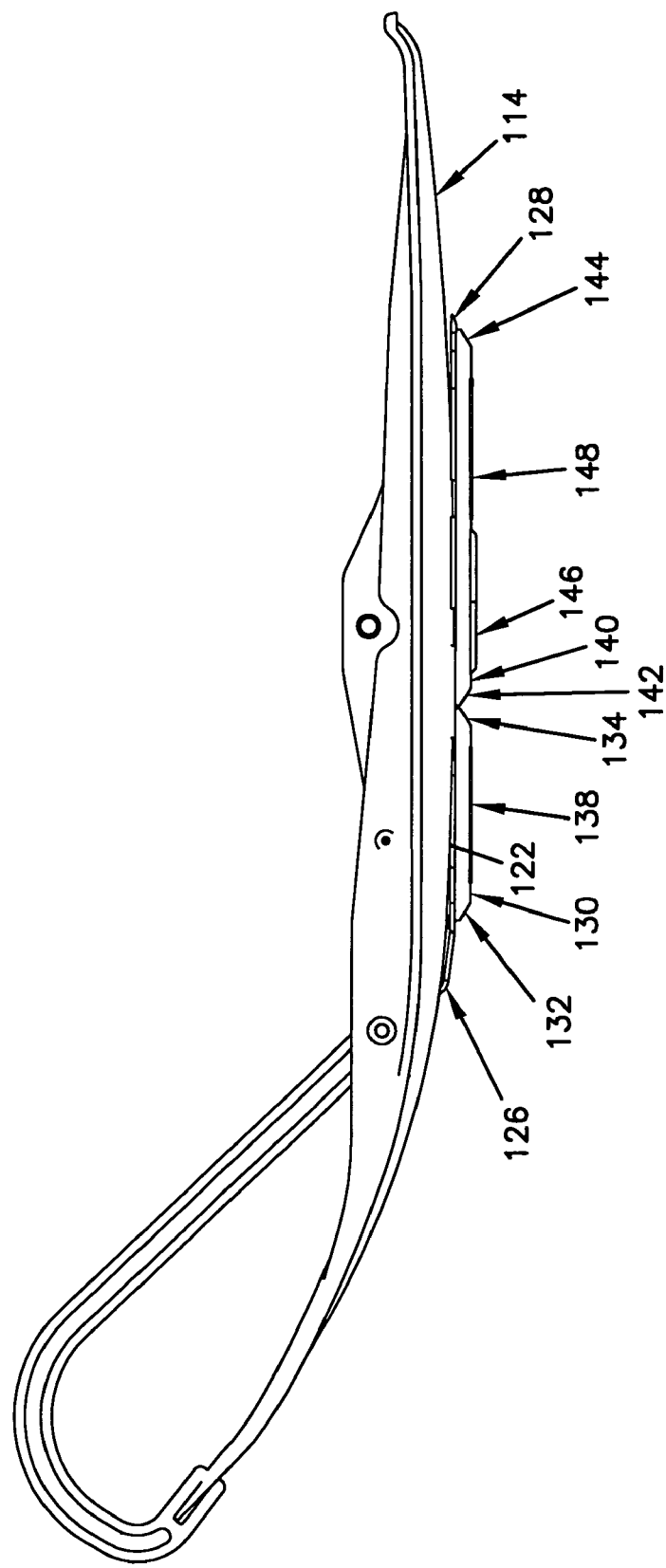
FIG. 13 is a bottom view of an exemplary ski in accordance with the principles of the present invention.
Figure 14:
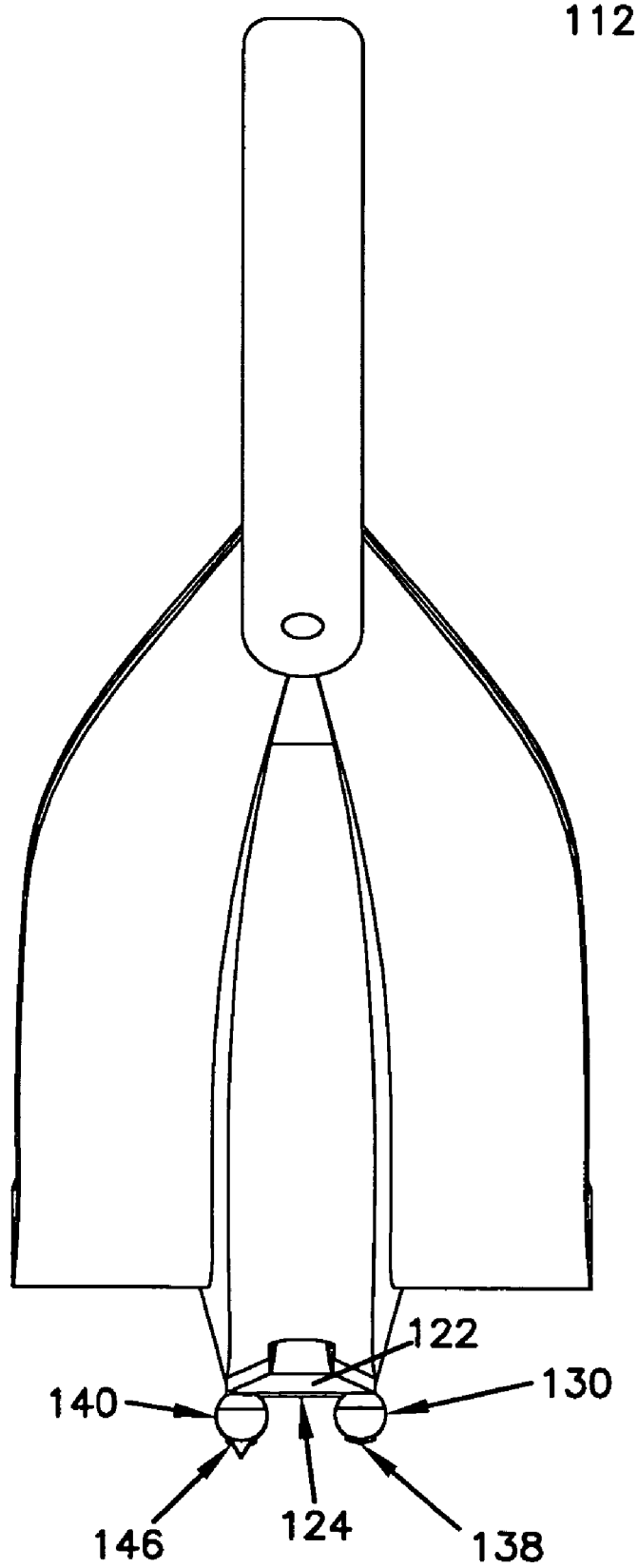
FIG. 14 is a side view of the ski from FIG. 13.
Figure 15:
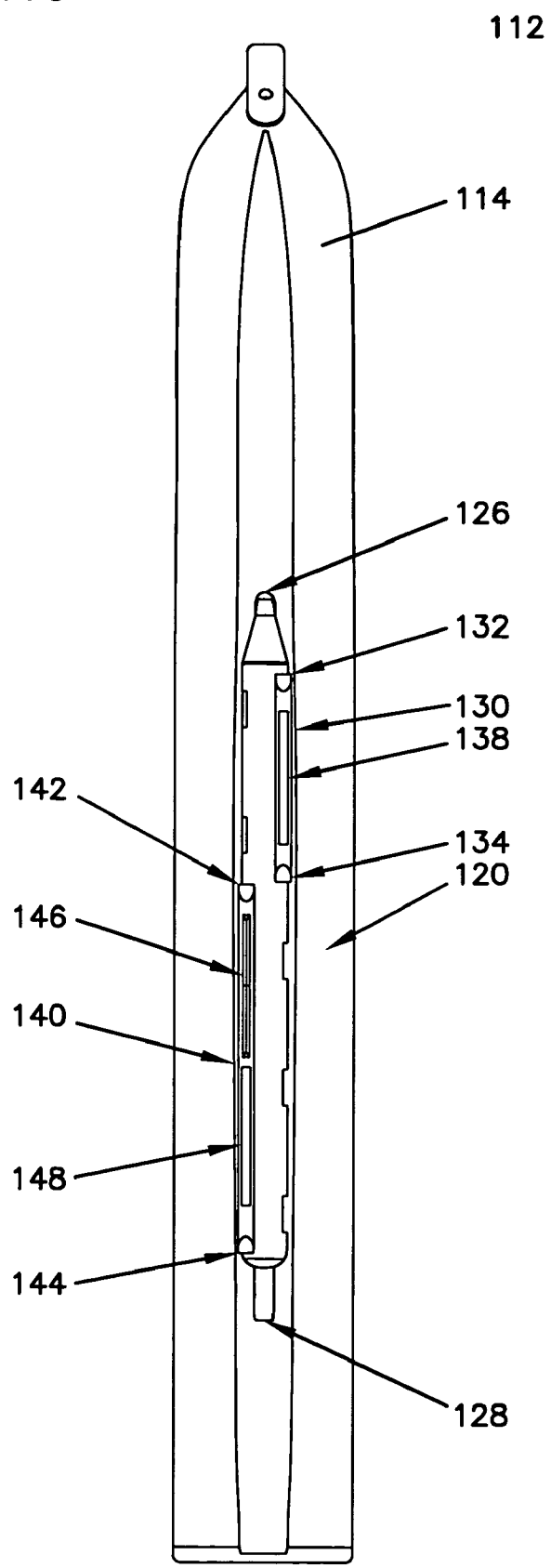
FIG. 15 is a front end view of the ski from FIG. 13.

For purposes of clarity, the figures previously referenced herein to illustrate the described features of the present invention show skis and skags having a relatively simple structure. However, this is exemplary only. The structure of skis and/or skags is not limited to the geometrically simple arrangements shown in FIGS. 6-12 and 16. Rather, the structure of skags and skis may be considerably more complex, as may be seen from the exemplary embodiments shown in FIGS. 13-15.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A ski skag adapted to be attached to a bottom surface of a ski to be ridden on a snow surface, the bottom surface extending from a first side edge to a second side edge, the ski skag comprising:

a first longitudinal rail extending down from the bottom surface of the ski, the first longitudinal rail forming a rigid bar for projecting from the bottom surface of the ski into the snow; the first longitudinal rail located proximate the first side edge of the ski, the first longitudinal rail having a forward end and an aft end with a first lowermost surface extending along a substantial portion of the first longitudinal rail between the forward end and the aft end; and a second longitudinal rail extending down from the bottom surface of the ski; the second longitudinal rail forming a rigid bar for projecting from the bottom surface of the ski into the snow, the second longitudinal rail having a forward end and an aft end with a second lowermost surface extending along a substantial portion of the second longitudinal rail between the forward end and the aft end;

wherein said first and second rails are fixedly coupled to the ski and laterally spaced from each other by a spaced apart region, the forward end of the first rail is positioned farther forward on the ski than the forward end of the second rail, and the aft end of the second rail is positioned farther aft than the aft end of the first rail such that the first and second rails are substantially staggered with respect to each other to permit snow to escape from under the ski without becoming trapped within the spaced apart region located between the rails, wherein the lowermost surfaces of the first and second rails are substantially coplanar and are offset from the bottom surface of the ski.

2. The ski skag of claim 1, further comprising:
a carrier platform adapted to be attached to said bottom surface of said ski, said first and second rails being disposed on a bottom surface of said carrier platform so as to be disposed on said bottom surface of said ski.

3. The ski skag according to claim 1, wherein:
said aft end of said first rail is at least as far forward as said forward end of said second rail.

4. The ski skag according to claim 1, wherein:
said aft end of said first rail is farther forward than said forward end of said second rail.

5. The ski skag according to claim 1, wherein:
at least one of said rails comprises a keel disposed thereon.

6. The ski skag according to claim 1, wherein:
at least one of said rails comprises a hard-surface weld disposed thereon.

7. The ski skag according to claim 1, wherein:
each of said rails comprises either a keel or a hard-surface weld disposed thereon.

8. The ski skag according to claim 1, wherein:
said second rail comprises a keel disposed thereon, and said first rail comprises a hard-surface weld disposed thereon.

9. A ski skag kit, comprising:
a first ski skag configured for attachment to a bottom side of a first ski, comprising:
a first and a second longitudinal rail each adapted to be attached to a bottom surface of said first ski skag; and
a keel or a hard-surface weld disposed on an underside of each of the first and second rails, the keel or hard-surface weld having a hardness greater than the first and second rails;
wherein said first and second rails are laterally spaced apart by a spaced apart region, a forward end of said first rail is farther forward than a forward end of said second rail, and an aft end of said second rail is farther aft than an aft end of said first rail such that the first and second rails are substantially staggered to permit snow to escape from under the ski without becoming sufficiently trapped within the spaced apart region located between the rails;
a second ski skag configured for attachment to a bottom side of a second ski, comprising:
a third and a fourth longitudinal rail each adapted to be attached to a bottom surface of said second ski skag;
a keel or a hard-surface weld disposed on an underside of each of the third and fourth rails, the keel or hard-surface weld having a hardness greater than the third and fourth rails;
wherein said third and fourth rails are laterally spaced apart by a spaced apart region, a forward end of said third rail is farther forward than a forward end of said fourth rail, and an aft end of said fourth rail is farther aft than an aft end of said third rail such that the first and second rails are substantially staggered to permit snow to escape from under the ski without becoming sufficiently trapped within the spaced apart region located between the rails;
a first carrier platform adapted to be attached to said bottom surface of said first ski skag, said first and second rails being disposed on a bottom surface of said first carrier platform so as to be disposed on said bottom surface of said first ski skag; and
a second carrier platform adapted to be attached to said bottom surface of said second ski skag, said third and fourth rails being disposed on a bottom surface of said second carrier platform so as to be disposed on said bottom surface of said second ski skag.

10. A method of improving durability for a vehicle ski, the method comprising:
providing a ski skag that includes a bottom surface and first and second longitudinal rails;
disposing said first and second rails on said bottom surface of said ski skag projecting locally downwardly from said bottom surface;
spacing said first and second rails apart laterally about a centerline of said ski skag; and
positioning a forward end of said first rail farther forward than a forward end of said second rail and an aft end of said second rail farther aft than an aft end of said first rail;
wherein said first and second rails each have at least one from the group consisting of a keel and a hard surface weld secured thereon, the keel or hard surface weld projecting locally downwardly from a lowermost surface of the first and second rails; and
wherein said ski skag further comprises a carrier platform said method further comprising mounting said first and second rails directly to a bottom surface of said first carrier platform so as to be disposed on said bottom surface of said ski, and securing said carrier platform to a bottom surface of said ski.

\* \* \* \* \*